United States Patent
Noh et al.

(10) Patent No.: US 10,490,840 B2
(45) Date of Patent: Nov. 26, 2019

(54) CABLE-TYPE SECONDARY BATTERY

(71) Applicant: LG Chem, Ltd., Seoul (KR)

(72) Inventors: Suk-In Noh, Daejeon (KR);
Dong-Chan Lee, Daejeon (KR);
In-Sung Uhm, Daejeon (KR);
Je-Young Kim, Daejeon (KR);
Jong-Hwa Choi, Daejeon (KR)

(73) Assignee: LG Chem, Ltd. (KR)

( * ) Notice: Subject to any disclaimer, the term of this patent is extended or adjusted under 35 U.S.C. 154(b) by 77 days.

(21) Appl. No.: 15/765,663

(22) PCT Filed: Sep. 9, 2016

(86) PCT No.: PCT/KR2016/010213
§ 371 (c)(1),
(2) Date: Apr. 3, 2018

(87) PCT Pub. No.: WO2017/069404
PCT Pub. Date: Apr. 27, 2017

(65) Prior Publication Data
US 2018/0309153 A1    Oct. 25, 2018

(30) Foreign Application Priority Data
Oct. 21, 2015    (KR) ........................ 10-2015-0146961

(51) Int. Cl.
*H01M 10/04* (2006.01)
*H01M 10/0587* (2010.01)
(Continued)

(52) U.S. Cl.
CPC ....... *H01M 10/0409* (2013.01); *H01M 2/022* (2013.01); *H01M 2/0275* (2013.01);
(Continued)

(58) Field of Classification Search
CPC combination set(s) only.
See application file for complete search history.

(56) References Cited

U.S. PATENT DOCUMENTS

| | | |
|---|---|---|
| 2007/0243456 A1 | 10/2007 | Ahn et al. |
| 2008/0138702 A1 | 6/2008 | Nakamura et al. |

(Continued)

FOREIGN PATENT DOCUMENTS

| | | |
|---|---|---|
| KR | 20080015373 A | 2/2008 |
| KR | 20080105655 A | 12/2008 |

(Continued)

OTHER PUBLICATIONS

International Search Report for PCT/KR2016/010213 dated Dec. 23, 2016.

*Primary Examiner* — Kaity V Chandler
(74) *Attorney, Agent, or Firm* — Lerner, David, Littenberg, Krumholz & Mentlik, LLP

(57) ABSTRACT

The present disclosure relates to a cable-type secondary battery having improved performance and capable of alleviating stress caused by external force. The present disclosure provides provided a sheet-type electrode assembly which includes: an electrode array including an inner electrode, a first separator, a double-sided electrode, a second separator and an outer electrode stacked successively; and a support layer formed integrally on at least one surface of the electrode array by compression, and a cable-type secondary battery including the same.

11 Claims, 3 Drawing Sheets

(51) Int. Cl.
*H01M 2/08* (2006.01)
*H01M 4/75* (2006.01)
*H01M 2/02* (2006.01)
*H01M 4/02* (2006.01)
*H01M 10/0525* (2010.01)

(52) U.S. Cl.
CPC ............. *H01M 2/08* (2013.01); *H01M 4/75* (2013.01); *H01M 10/0431* (2013.01); *H01M 10/0436* (2013.01); *H01M 10/0468* (2013.01); *H01M 10/0587* (2013.01); *H01M 10/0525* (2013.01); *H01M 2004/025* (2013.01)

(56) References Cited

U.S. PATENT DOCUMENTS

| | | | | |
|---|---|---|---|---|
| 2010/0255371 A1* | 10/2010 | Takayama | ............ | H01M 2/1673 429/210 |
| 2010/0266878 A1* | 10/2010 | Eilertsen | ............. | H01G 9/0003 429/53 |
| 2012/0214051 A1* | 8/2012 | Tsukuda | ............. | H01M 2/0257 429/179 |
| 2013/0029205 A1* | 1/2013 | Adams | ................... | B32B 27/08 429/160 |
| 2013/0065097 A1* | 3/2013 | Hosaka | ................. | H01M 2/266 429/61 |
| 2013/0224533 A1* | 8/2013 | Zhu | ................... | H01M 10/0525 429/9 |
| 2014/0042988 A1* | 2/2014 | Kuttipillai | ............... | H01G 11/30 320/167 |
| 2014/0120408 A1* | 5/2014 | Kim | .................... | H01M 2/1673 429/162 |
| 2014/0170456 A1 | 6/2014 | Kwon et al. | | |
| 2014/0272540 A1* | 9/2014 | Takahata | ................ | H01M 4/622 429/156 |
| 2014/0335391 A1* | 11/2014 | Kwon | ................... | H01M 2/022 429/94 |
| 2014/0377606 A1* | 12/2014 | Kwon | ............... | H01M 10/0422 429/72 |
| 2014/0377613 A1 | 12/2014 | Kwon et al. | | |
| 2014/0377615 A1* | 12/2014 | Kwon | ............... | H01M 10/0565 429/94 |
| 2014/0377616 A1 | 12/2014 | Kwon et al. | | |
| 2015/0072204 A1* | 3/2015 | Kwon | ..................... | H01M 2/26 429/94 |
| 2016/0156065 A1* | 6/2016 | Visco | ................ | H01M 10/0562 429/322 |
| 2016/0226281 A1* | 8/2016 | Gadkaree | .............. | H01G 11/06 |

FOREIGN PATENT DOCUMENTS

| | | |
|---|---|---|
| KR | 20130045218 A | 5/2013 |
| KR | 20140128881 A | 11/2014 |
| KR | 101542096 B1 | 8/2015 |

\* cited by examiner

CABLE-TYPE SECONDARY BATTERY

CROSS-REFERENCE TO RELATED APPLICATIONS

The present application is a national phase entry under 35 U.S.C. § 371 of International Application No. PCT/KR2016/010213, filed Sep. 9, 2016, published in Korean, which claims priority to Korean Patent Application No. 10-2015-0146961 filed on Oct. 21, 2015 in the Republic of Korea, the disclosures of which are incorporated herein by reference.

TECHNICAL FIELD

The present disclosure relates to a freely deformable cable-type secondary battery. More particularly, the present disclosure relates to a cable-type secondary battery which has improved safety and processability.

BACKGROUND ART

In recent times, a secondary battery refers to a device which converts external electric energy into the form of chemical energy and stores it therein, and then generates electricity as necessary. Such a secondary battery is also called the name of 'rechargeable battery' which means a battery capable of being charged many times. Typical secondary batteries include a lead storage battery, nickel cadmium (Ni—Cd) battery, nickel metal hydride (NiMH) battery, lithium ion (Li-ion) battery and a lithium ion (Li-ion) polymer battery. A secondary battery provides both an economical advantage and an environmental advantage as compared to a disposable primary battery.

Currently, a secondary battery is used for some applications requiring low electric power. For example, such applications include a device that helps starting of a car, portable system, instrument and a no-brake power supply system. Recently, development of wireless communication technology leads popularization of a portable system. In addition, there is a tendency to convert many conventional systems into wireless systems. Under these circumstances, there is an exploding demand for secondary batteries. Further, hybrid cars and electric cars have been commercialized with a view to preventing environmental pollution. Such next-generation vehicles adopt secondary batteries to reduce the cost and weight and to increase the service life.

In general, secondary batteries are generally provided as cylindrical, prismatic or pouch-type batteries. This is because secondary batteries are manufactured by installing an electrode assembly including a negative electrode, positive electrode and a separator into a cylindrical or prismatic metal can or a pouch-type case made of an aluminum laminate sheet, and then injecting an electrolyte to the electrode assembly. Therefore, a predetermined space for installing a secondary battery is required essentially. Thus, such cylindrical, prismatic or pouch-like shapes of secondary batteries undesirably function as limitations in developing various types of portable systems. As a result, there is a need for a novel type of secondary battery which allows easy deformation.

To satisfy such a need, a linear battery, which has a significantly larger ratio of length to sectional diameter, has been suggested. Korean Laid-Open Patent No. 2005-99903 discloses a variable battery including an inner electrode, an outer electrode and an electrolyte layer interposed between both electrodes. However, such a battery has poor flexibility. In addition, the linear battery uses a polymer electrolyte to form an electrolyte layer, and thus makes it difficult to inject an electrolyte into an electrode active material, thereby causing an increase in resistance of the battery and degradation of capacity and cycle characteristics.

Additionally, when forming a cable-type secondary battery, a non-uniform gap is generated between the inner electrode/the outer electrode and a separator layer interposed therebetween. However, such a gap prohibits smooth injection of an electrolyte to the active material layer of the outer electrode, thereby causing a problem of degradation of battery performance Further, when using a wire-type current collector in a cable-type secondary battery, a linear resistance is generally higher than a sheet resistance. Thus, a wire-type current collector has higher resistance characteristics as compared to a sheet-type current collector, thereby causing degradation of battery performance. On the contrary, a sheet-type current collector has relatively lower strength, thereby causing a problem of cutting.

Moreover, when manufacturing a cable-type secondary battery by using a sheet-type current collector, a process of winding each of sheet-type electrodes and separators has to be undergone, resulting in an increase in processing time and a difficulty in connecting a current collector with an electrode tab.

DISCLOSURE

Technical Problem

The present disclosure is directed to providing a novel linear structured secondary battery which is easily deformable, can maintain safety and excellent performance, facilitates injection of an electrode into an electrode active material, and requires a simple manufacturing process.

Technical Solution

In one aspect of the present disclosure, there is provided a sheet-type electrode assembly which includes: an electrode array including an inner electrode, a first separator, a double-sided electrode, a second separator and an outer electrode stacked successively; and a support layer formed integrally on at least one surface of the electrode array by compression.

Preferably, the first separator and the second separator may have a width corresponding to 1-2 times of the width of the electrodes.

Preferably, the support layer may be a mesh-type porous membrane, a non-woven fabric or a polymer film.

Preferably, the electrode assembly may be formed by compression in such a manner that each of the electrodes and the separators may be integrated to have a peel strength of 15-300 N/m.

Preferably, the inner electrode and the outer electrode may be negative electrodes or positive electrodes and the double-sided electrode may be a positive electrode or negative electrode corresponding thereto.

In another aspect, there is provided a cable-type secondary battery which includes: an inner support; and the above-mentioned sheet-type electrode assembly formed to surround the outer surface of the inner support by spiral winding.

Preferably, the sheet-type electrode assembly may have a structure of a strip extended in one side direction.

Preferably, the sheet-type electrode assembly may be formed by way of spiral winding in such a manner that an overlapped portion may be formed, and the overlapped portion may have a width corresponding to 0.9 times or less of the width of the electrodes.

Preferably, the cable-type secondary battery may further include a protective coating formed to surround the outer surface of the sheet-type electrode assembly.

Advantageous Effects

According to the present disclosure, it is possible to improve the flexibility of an electrode significantly. In addition, when severe external force, such as complete bending of an electrode, is applied, the support layer shows a cushioning function even in the lack of an increase in binder content in an electrode active material layer, thereby alleviating cracking on the electrode active material and preventing separating of the electrode active material from the current collector. As a result, it is possible to prevent a decrease in battery capacity and to improve the cycle life characteristics of a battery.

In addition, since an integrally formed sheet-type electrode assembly is used, it is possible to improve processability and to reduce the overall thickness of electrodes, thereby improving the energy density of a battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

When a current collector is applied in the form of a conventional sheet in a cable-type secondary battery, it is possible to reduce the resistance of the battery as compared to a wire-type current collector. However, such a sheet-type current collector has relatively lower strength and thus has a problem of cutting of the current collector, or the like.

However, according to the present disclosure, there is provided a sheet-type electrode assembly which includes an electrode array including an inner electrode, a first separator, a double-sided electrode, a second separator and an outer electrode stacked successively, and a support layer formed integrally on at least one surface of the electrode array by compression. Thus, it is possible to inhibit a disconnection in a current collector under the conditions of external bending/distortion, thereby improving the flexibility of a cable-type secondary battery. The electrode assembly may have a strip structure extended in one side direction.

Figure 1:
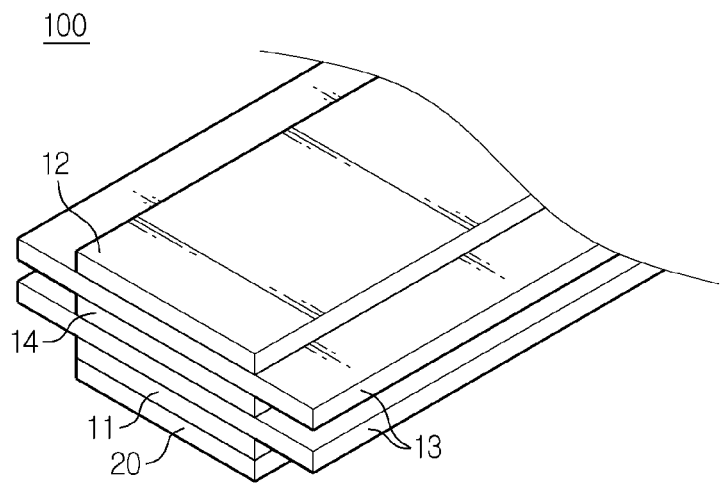
FIG. 1 and FIG. 2 are schematic perspective views illustrating a sheet-type electrode assembly according to an embodiment of the present disclosure.
Figure 2:
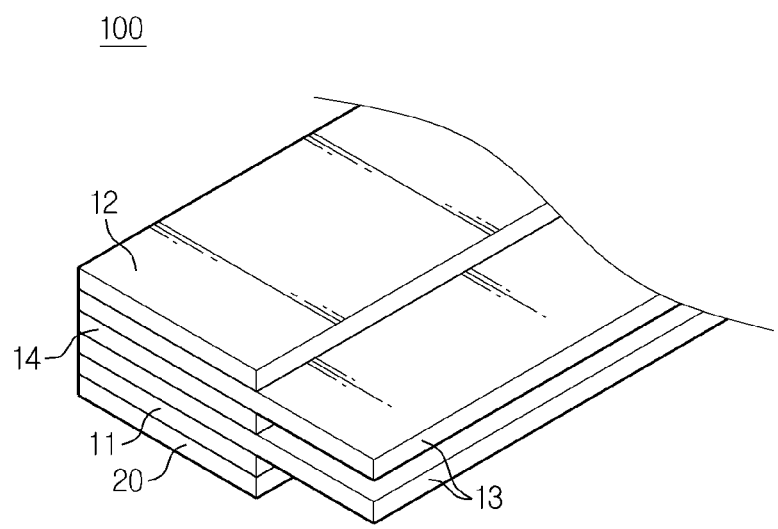

FIG. 1 and FIG. 2 are schematic perspective views illustrating a sheet-type electrode assembly according to an embodiment of the present disclosure. Referring to FIG. 1 and FIG. 2, there is provided a sheet-type electrode assembly 100 which includes an electrode array including an inner electrode 11, a first separator 13, a double-sided electrode 14, a second separator 13 and an outer electrode 12 stacked successively, and a support layer 20 formed integrally on at least one surface of the electrode array by compression.

In addition, according to an embodiment of the present disclosure, the electrode array may further include two or more double-sided electrodes and a separator interposed between one electrode and another electrode. For example, the electrode array may include a structure of inner electrode/separator/double-sided electrode/separator/double-sided electrode/separator/outer electrode, and may optionally further include a double-sided electrode and a separator.

The inner electrode includes an inner electrode current collector and an inner electrode active material layer formed on one surface of the inner electrode current collector, and the outer electrode includes an outer electrode current collector and an outer electrode active material layer formed on one surface of the outer electrode current collector. In addition, the double-sided electrode includes a double-sided electrode current collector and a double-sided electrode active material layer formed on one surface of the double-sided electrode current collector.

The first separator and the second separator may use an electrolyte layer or a porous polymer substrate.

The electrolyte functioning as a channel of ions may include a gel polymer electrolyte using PEO, PVdF, PVdF-HFP, PMMA, PAN or PVAc; or a solid electrolyte using PEO, polypropylene oxide (PPO), polyethylene imine (PEI), polyethylene sulfide (PES) or polyvinyl acetate (PVAc); or the like. The matrix of the solid electrolyte preferably includes a polymer or ceramic glass as a fundamental skeleton. In the case of a general polymer electrolyte, ions may move very slowly due to reaction rate even though ion conductivity is satisfied. Thus, it is preferred to use a gel polymer electrolyte through which ion transfer is carried out more easily as compared to a solid electrolyte. Since a gel polymer electrolyte does not have excellent mechanical properties, it may include a support to supplement such mechanical properties. The support that may be used includes a porous support or crosslinked polymer. In addition, the electrolyte layer may further include a lithium salt. The lithium salt improves ion conductivity and reaction rate, and non-limiting examples thereof may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborane, lower aliphatic lithium carboxylate and lithium tetraphenylborate, or the like.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; or a separator provided with a porous coating layer formed of a mixture of inorganic particles and a binder polymer on at least one surface of the porous polymer substrate.

The support layer may be a mesh-type porous membrane, a non-woven fabric or a polymer film. The support layer may include any one selected from the group consisting of high density polyethylene, low density polyethylene, linear low density polyethylene, ultrahigh molecular weight polyethylene, polypropylene, polyethylene terephthalate, polyester, polyacetal, polyamide, polycarbonate, polyimide, polyetheretherketone, polyether sulfone, polyphenylene oxide, polyphenylene sulfide and polyethylene naphthalate, or a mixture thereof.

The electrode assembly may be formed by compressing the electrodes and separators in such a manner that they may be integrated to have a peel strength of 15-300 N/m. When satisfying the above-defined range of peel strength, an adequate level of adhesion capable of preventing separation between a separator and an electrode is obtained so that the separator and electrode may be adhered and integrated with each other.

The inner electrode and the outer electrode may be negative electrodes or positive electrodes, and the double-sided electrode may be a positive electrode or negative electrode corresponding thereto.

Figure 3:
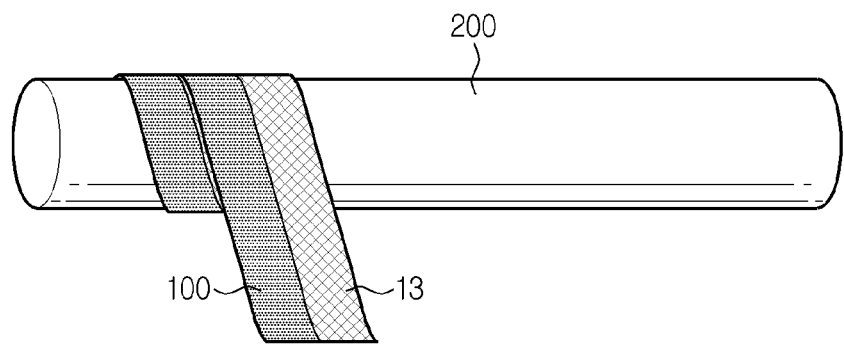
FIG. 3 is a schematic view illustrating how a sheet-type electrode assembly according to an embodiment of the present disclosure is wound on the outer surface of an inner support.

In addition, FIG. 3 is a schematic view illustrating how a sheet-type electrode assembly according to an embodiment of the present disclosure is wound on the outer surface of an inner support. Referring to FIG. 3, there is provided a cable-type secondary battery which includes: an inner support 200; and the above-mentioned sheet-type electrode assembly 100 formed to surround the outer surface of the inner support 200 by spiral winding.

Herein, the term 'spiral' may be interchanged with 'helix', means a shape which winds diagonally in a certain range, and generally refers to a shape similar to the shape of a general spring.

The inner support functions to retain the linear shape of a cable-type secondary battery, to prevent deformation of a battery structure caused by external force and to prevent collapse or deformation of an electrode structure, thereby ensuring the flexibility of a cable-type secondary battery. The inner support may include an insulating material formed of at least one selected from the group consisting of polyethylene, polypropylene, polytetrafluoroethylene, polyvinylidene fluoride, polyacrylonitrile, polyimide, polyethylene terephthalate, polyamide imide, polyester imide, polyether sulfone and polysulfone, or the inner support may include a metal such as insulation-treated aluminum or copper, but is not limited thereto.

One or more inner supports may be used and a plurality of inner supports may be arranged in parallel with each other or may have a spirally twisted shape.

The width of the electrodes of the sheet-type electrode assembly may be determined by the thickness of the inner support. Preferably, the width of each electrode may be smaller than the outer circumference of the inner support.

The first separator and the second separator may have a width corresponding to 1-2 times of the width of the electrodes. When the width of the separator is larger than that of the electrodes, it is possible to protect the side portion upon winding of the electrode assembly and to prevent generation of an internal short-circuit caused by the contact between electrodes while the cable-type secondary battery is bent by external force. As a result, it is possible to facilitate improvement of the flexibility of a battery, to avoid a need for an additional separator, to improve the ion conductivity of a battery, and thus to contribute to improvement of the performance of a battery.

Referring to FIG. 1, the electrodes 11, 12, 14 and the support layer 20 may be located at the central portion of the separators 13. Referring to FIG. 2, the electrodes 11, 12, 14 and the support layer 20 may be located so that they may be aligned at one side of the separators 13.

The sheet-type electrode assembly may have a structure of a strip extended in one side direction.

The sheet-type electrode assembly may be formed by spiral winding in such a manner that an overlapped portion may be formed, and the overlapped portion may have a width corresponding to 0.9 times or less of the width of the electrodes. Since the separator of the sheet-type electrode assembly has a larger width than that of the electrodes, it is possible to carry out winding in such a manner that an electrode may be located on the previously wound separator. Referring to FIG. 3, the support layer and the electrodes of the sheet-type electrode assembly 100 are aligned at one side of the separator 13, and winding may be carried out in such a manner that the electrode array may be located on the previously wound separator 13.

In addition, the cable-type secondary battery may further include a protective coating formed to surround the outer surface of the sheet-type electrode assembly.

The protective coating is an insulator formed on the outside of the electrode assembly in order to protect the electrodes against moisture in the air and external impact. The protective coating may use a conventional polymer resin including a water barrier layer. Herein, the water barrier layer may include aluminum or a liquid crystal polymer having excellent water barrier property, and the polymer resin that may be used includes PET, PVC, HDPE or epoxy resin.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE

An inner support having a diameter of 1300 μm was prepared.

Next, negative electrode active material slurry including 70 wt % of graphite as a negative electrode active material, 5 wt % of Denka black as a conductive material and 25 wt % of PVdF as a binder was prepared, and then the negative active material slurry was applied onto copper foil and slitting was carried out with a width of 3 mm to obtain a sheet-type inner electrode (negative electrode) and an outer electrode (negative electrode).

In addition, positive electrode active material slurry including 80 wt % of $LiCoO_2$ as a positive electrode active material, 5 wt % of Denka black and 15 wt % of PVdF as a binder was prepared, and then the positive electrode active material slurry was applied to both surfaces of aluminum foil and slitting was carried out with a width of 3 mm to obtain a sheet-type double-sided electrode (positive electrode).

Then, PET was used to obtain two sheets of sheet-type support layers having a thickness of 12 μm and a width of 3 mm.

After that, a sheet-type separator made of a polyolefin substrate and having a width of 4 mm, the sheet-type electrodes and the sheet-type support layer were attached with each other in the order of the support layer/inner electrode/double-sided electrode/separator/outer electrode/support layer in such a manner that the electrodes and the support layer may be located at one side of each separator. Then, a lamination process was carried out by using a roll press to obtain an integrated sheet-type electrode assembly.

The obtained electrode assembly was wound on the outer surface of the inner support in such a manner that the subsequently wound electrode assembly may be overlapped in the extended portion of the separator of the previously wound electrode assembly.

Then, a heat shrinking tube having a water barrier layer was formed on the outer surface of the wound electrode assembly and the heat shrinking tube was allowed to be shrunk by applying heat thereto, thereby forming a protective coating layer. After that, packaging was carried out by using three-side sealing while an injection port is open. After injecting an electrolyte, sealing was carried out completely to obtain a cable-type secondary battery.

Comparative Example

The same inner support, sheet-type inner electrode (negative electrode), outer electrode (negative electrode) and sheet-type double-sided electrode (positive electrode) as Example were prepared, and a sheet-type separator made of a polyolefin substrate and having a width of 7 mm was also prepared.

The sheet-type electrodes and the sheet-type separators were wound on the outer surface of the inner support in the order of the inner electrode/separator/double-sided electrode/separator/outer electrode. The winding was carried out in such a manner that no overlap was formed between electrodes and the separators were overlapped with 3.5 mm.

Then, a heat shrinking tube having a water barrier layer was formed on the outer surface and the heat shrinking tube was allowed to be shrunk by applying heat thereto, thereby forming a protective coating layer. After that, packaging was carried out by using three-side sealing while an injection port is open. After injecting an electrolyte, sealing was carried out completely to obtain a cable-type secondary battery.

Test for Life Characteristics

Figure 4:
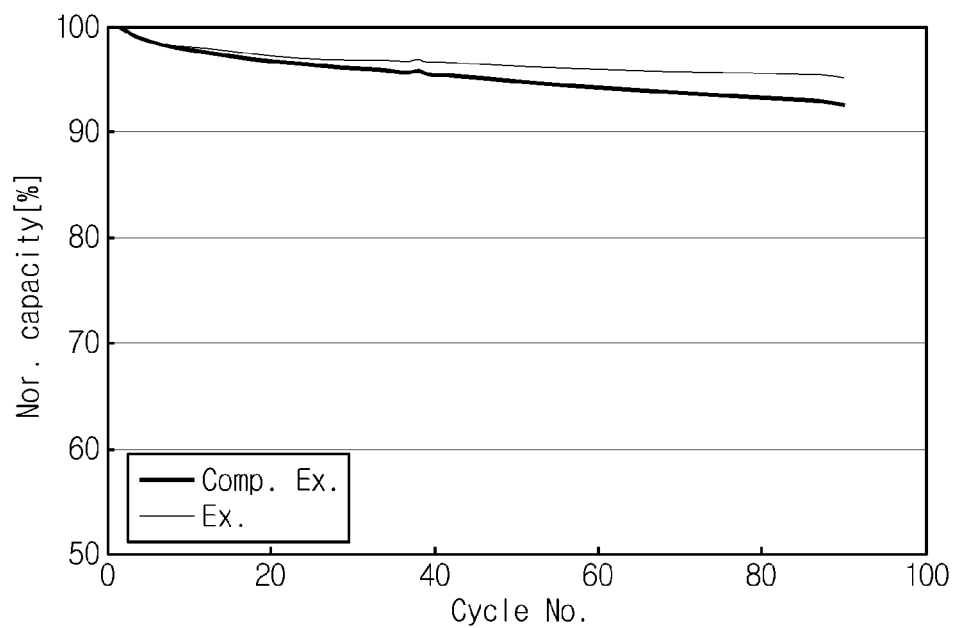
FIG. 4 is a graph illustrating the cycle life characteristics of the cable-type secondary batteries according to Examples and Comparative Examples.
Figure 5:
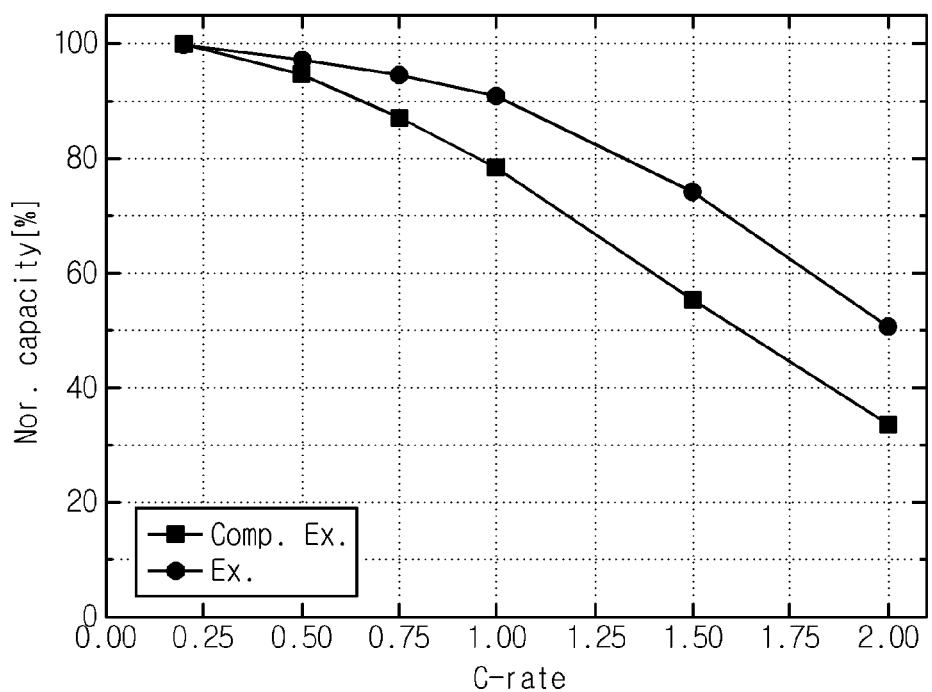
FIG. 5 is a graph illustrating the normalized capacity of the cable-type secondary batteries according to Examples and Comparative Examples as a function of C-rate.

Each of the cable-type secondary batteries according to Example and Comparative Example was determined for capacity as a function of cycle number based on the initial capacity under the condition of charging at 1 C and discharging at 1 C. The results are shown in FIG. 4. In addition, capacity was determined as a function of C-rate. The results are shown in FIG. 5. In FIG. 5, a larger capacity value suggests a lower cell resistance.

In the cable-type secondary battery according to Example of the present disclosure, the electrodes, separator and support layer are wound integrally. On the contrary, in the cable-type secondary battery according to Comparative Example, the separators should be wound to have an overlapped portion in order to prevent a short-circuit, and thus two layers of separators are located between one electrode and another electrode. Therefore, referring to FIG. 4 and FIG. 5, the cable-type secondary battery according to Example of the present disclosure shows higher life characteristics as compared to in the cable-type secondary battery according to Comparative Example.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description. Therefore, the examples described herein are for illustrative purposes only and not intended to limit the scope of this disclosure. The scope of the present disclosure is defined by the following claims, and it is to be understood that various changes and modifications within the equivalents thereof fall within the scope of the present disclosure.

DESCRIPTION OF DRAWING NUMERALS

11: Inner electrode
12: Outer electrode
13: Separator
14: Double-sided electrode
20: Support layer
100: Sheet-type electrode assembly
200: Inner support

What is claimed is:

1. A cable-type secondary battery, comprising:
an inner support; and
a sheet-type electrode assembly formed to surround an outer surface of the inner support by way of helical winding,
wherein the sheet-type electrode assembly includes an electrode array comprising an inner electrode, a first separator, a double-sided electrode, a second separator and an outer electrode stacked successively, each of the first separator and the second separator having a width that is greater than a width of each of the inner electrode, the double-sided electrode, and the outer electrode, and
wherein the sheet-type electrode assembly is wound on the outer surface of the inner support in such a manner that is overlapped by an extended portion of the separators.

2. The cable-type secondary battery according to claim 1, wherein the first separator and the second separator extend outward from the electrodes toward at least one side of the electrode array.

3. The cable-type secondary battery according to claim 1, wherein the first separator and the second separator extend outward from the electrodes toward both sides of the electrode array.

4. The cable-type secondary battery according to claim 1, wherein the first separator and the second separator have a width that is greater than the width of each of the electrodes by more than 1 time and not more than 2 times.

5. The cable-type secondary battery according to claim 1, which further comprises a support layer formed integrally on at least one surface of the electrode array by compression.

6. The cable-type secondary battery according to claim 5, wherein the support layer is a mesh-type porous membrane, a non-woven fabric or a polymer film.

7. The cable-type secondary battery according to claim 1, wherein the electrode assembly is formed by compression in such a manner that each of the electrodes and the separators is integrated to have a peel strength of 15-300 N/m.

8. The cable-type secondary battery according to claim 1, wherein the inner electrode and the outer electrode are negative electrodes or positive electrodes and the double-sided electrode is a positive electrode or a negative electrode corresponding thereto.

9. The cable-type secondary battery according to claim 1, wherein the sheet-type electrode assembly has a structure of a strip extended in one direction.

10. The cable-type secondary battery according to claim 1, wherein the overlapped portion has a width corresponding to 0.9 times or less of the widths of each of the electrodes.

11. The cable-type secondary battery according to claim 1, which further comprises a protective coating formed to surround the outer surface of the sheet-type electrode assembly.

* * * * *